United States Patent
Shtarkman et al.

[11] Patent Number: 5,984,385
[45] Date of Patent: Nov. 16, 1999

[54] ACTIVE ERM DAMPER FOR SPACECRAFT TELESCOPING STRUCTURES

[75] Inventors: Emil A. Shtarkman, Marina Del Rey; L. Dwight Gilger, Rancho Palos Verdes, both of Calif.

[73] Assignee: TRW Inc., Redondo Beach, Calif.

[21] Appl. No.: 09/076,516

[22] Filed: May 12, 1998

[51] Int. Cl.$^6$ ................................ E05C 17/56
[52] U.S. Cl. ................ 292/251.5; 292/1; 403/109.7; 403/DIG. 1; 188/267.1
[58] Field of Search ............... 292/251.5, 305, 292/306, 144, 141, 1; 403/109.7, 109.1, 377, DIG. 1; 188/267, 267.1

[56] References Cited

U.S. PATENT DOCUMENTS

| | | | |
|---|---|---|---|
| 3,885,881 | 5/1975 | Goldmann | 403/291 |
| 3,971,581 | 7/1976 | Montgomery | 292/251.5 |
| 4,259,825 | 4/1981 | Hedgepeth et al. | 52/645 |
| 4,578,920 | 4/1986 | Bush et al. | 52/645 |
| 4,819,399 | 4/1989 | Onoda | 52/646 |
| 4,869,476 | 9/1989 | Shtarkman | 267/140.1 |
| 4,896,752 | 1/1990 | Shtarkman | 188/299 |
| 4,942,947 | 7/1990 | Shtarkman | 188/267 |
| 4,958,474 | 9/1990 | Adams | 52/646 |
| 4,992,190 | 2/1991 | Shtarkman | 252/62.52 |
| 5,167,850 | 12/1992 | Shtarkman | 252/62.52 |
| 5,176,368 | 1/1993 | Shtarkman | 267/140.14 |
| 5,257,681 | 11/1993 | Shtarkman et al. | 188/267 |
| 5,277,281 | 1/1994 | Carlson et al. | 188/267 |
| 5,319,336 | 6/1994 | Alcon | 335/296 |
| 5,354,488 | 10/1994 | Shtarkman et al. | 252/62.56 |
| 5,367,459 | 11/1994 | Shtarkman et al. | 364/424.05 |
| 5,458,217 | 10/1995 | Ohishi | 188/267 |
| 5,489,009 | 2/1996 | Kawamata et al. | 188/267 |
| 5,492,430 | 2/1996 | Jones | 403/109 |
| 5,676,600 | 10/1997 | Campbell | 464/170 |
| 5,683,200 | 11/1997 | Levy | 403/317 |
| 5,868,445 | 2/1999 | Kaufman et al. | 292/251.5 |

*Primary Examiner*—Steven Meyers
*Assistant Examiner*—Clifford B Vaterlaus
*Attorney, Agent, or Firm*—Michael S. Yatsko

[57] ABSTRACT

A damped latch mechanism 116 is provided for a telescoping structure 10 including an inner tubular member 114 slidingly received within an outer tubular member 112. A first latch member 122 is coupled within the one tubular member 114 and a second latch member 126 is coupled to the other tubular member 114 so as to selectively interfere with the first latch member 122 to prevent the inner tubular member 114 from moving in an axial first direction relative to the outer tubular member 112. A fluid chamber 134 is provided on one of the first and second latch members 122, 126 opposite the other of the first and second latch members 122, 126. A magneto-rheological fluid 136 is disposed within the fluid chamber 134 to absorb shock between the first and second latch members 122, 126. A magnetic field source 140 is provided proximate the magneto-rheological fluid 136 for imposing a magnetic field upon the magneto-rheological fluid 136 to change the viscosity thereof to effectuate different damping characteristics between the first and second latch members 122, 126.

15 Claims, 4 Drawing Sheets

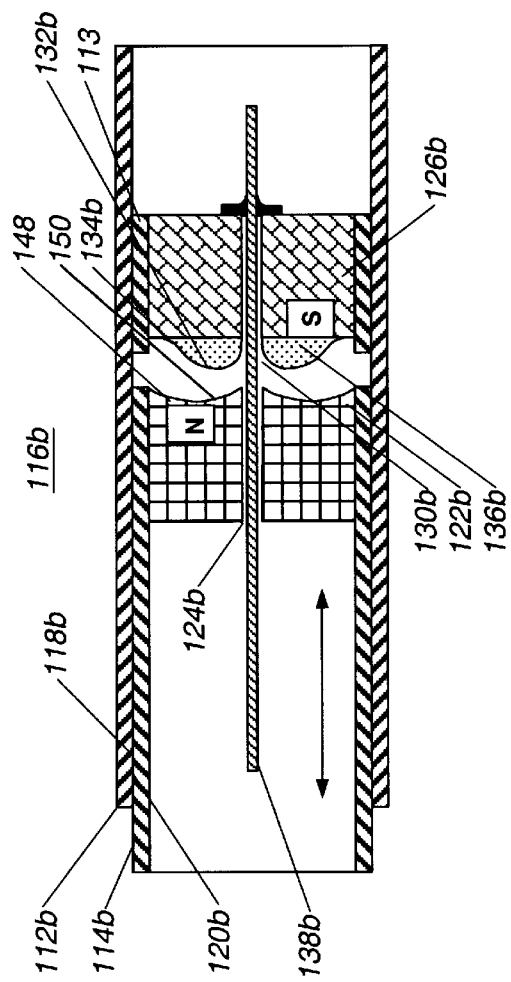
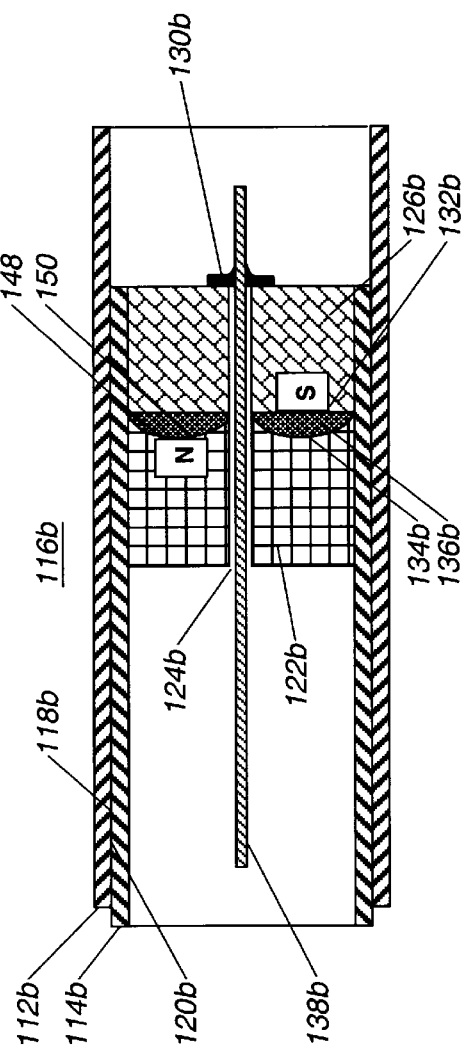

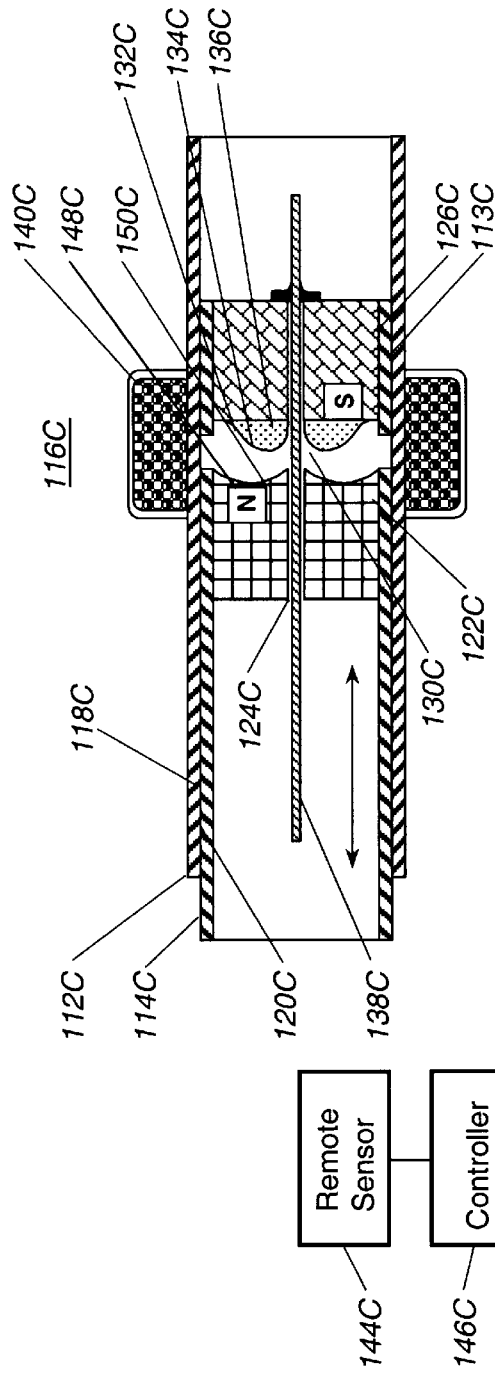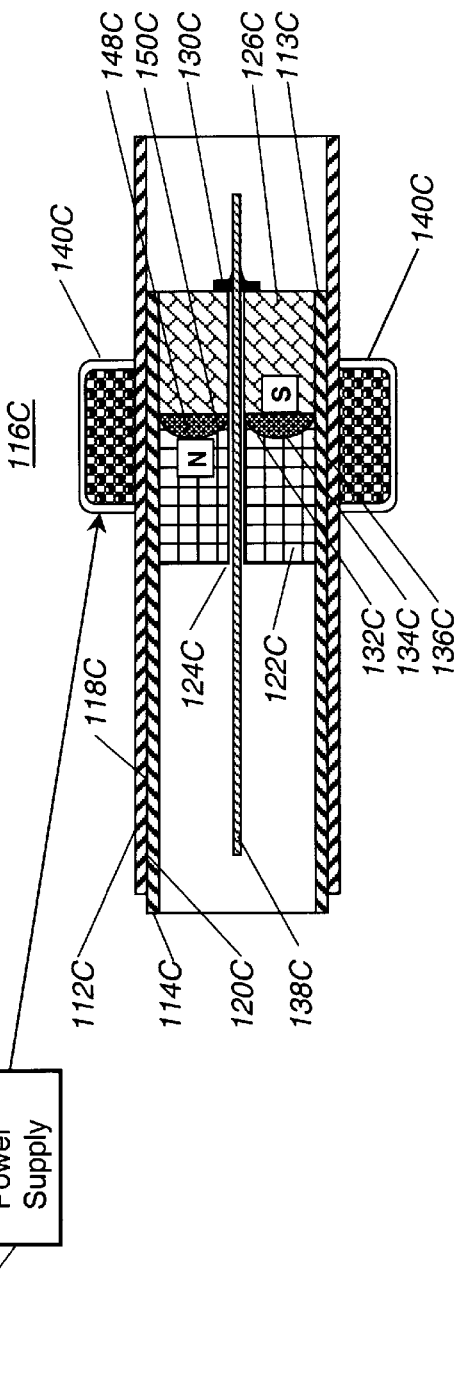

ACTIVE ERM DAMPER FOR SPACECRAFT TELESCOPING STRUCTURES

BACKGROUND OF THE INVENTION

1. Technical Field

The present invention generally relates to damping systems and, more particularly, to an apparatus for reducing vibrations in a latch mechanism of a telescoping structure such as those found in large diameter spacecraft antennas.

2. Discussion

In many situations where trusses, girders, or beams are needed, a conventional solid beam is unsuitable. It is essential that the structural member used be more light-weight, especially in those cases where transportation presents difficulties. It may be further desired that the element be collapsible to a compact size, and, finally, readily erectable upon deployment. These considerations are particularly crucial for operations in outerspace, such as deployment of antenna or space platforms. Launch is feasible only for those structures which are light-weight and compact. The addition of each unit of mass or volume is extremely expensive.

The size of orbital space structures is, at present, limited to the cargo volume of the National Aeronautics and Space Administration's space shuttle vehicle and/or launch vehicle payload volume. These vehicles have demonstrated the feasibility and practicality of transporting various payloads for deployment into spacial orbits about earth. It is now contemplated that larger packages may be transported and multiple segments assembled, expanded and/or added onto previously or subsequently launched payloads. It has previously been demonstrated that folded compact, rolled, and inflatable payloads may be compactly packaged for launch and deployed when placed in earth orbit. This procedure has proved especially effective for weather and communication satellites, antennas, and the like. Large volume truss structures and the like which can be collapsed for storage and transported in a relatively small volume and subsequently deployed at the sight of use to envelope a large volume and/or form planar, curved, and contoured surfaces appear to have valuable future use in space, on earth, and/or on other planets.

A truss structure is generally composed of straight members subject preferably to longitudinal compression, tension, or both. The members are disposed so as to make the structure rigid under anticipated loads. Truss structures are particularly desirable in space application because of their high strength and/or stiffness and low mass. Packaging a truss structure by the use of telescoping members introduces axial compliance, thereby decreasing the stiffness of the truss. In order to optimize stiffness and strength, a latch mechanism is employed. The latch mechanism should be sufficiently strong to hold the truss structure in its expanded configuration though it should be simply released to allow the truss structure to be recollapsed.

Some previously employed expandable truss structures have failed to use regulation mechanisms such as dampers, between expanding component parts. These aerial truss structures are thus deployed unconstrained. Uncontrolled, expandable trusses which are devoid of regulating features may exhibit kinematic anomalies during deployment or become distorted and prevent attainment of the desired final functional state or configuration. Further, induced oscillations of the device may prevent operation in a desired mode prior to settling.

Dampers of varying configurations have been used to various degrees in the automotive industry. For instance, U.S. Pat. No. 4,869,476 entitled "Electrically Controlled Viscous Elastic Spring" to Shtarkman and assigned to the Assignee of the present invention and incorporated by reference herein describes a spring for resisting relative movement of parts and for urging the parts to an initial, equilibrium position when the parts are moved therefrom. The spring uses a fluid, such as an electro-rheological fluid or a magnetic fluid, to provide a variable spring rate and a variable load-carrying capacity. The resistance to flow of these fluids varies as a function of the magnitude of either an electric field or a magnetic field applied to the fluid.

Another known device using electro-rheological fluid for damping is disclosed in U.S. Pat. No. 4,896,752 entitled "Vehicle Strut" to Shtarkman and assigned to the Assignee of the present invention which is also incorporated by reference herein. This reference discloses a strut for use in a suspension system wherein the spring and damping characteristics of the strut are controlled, in part, by an electro-rheological fluid disposed within fluid chambers in the strut. When the viscosity of the fluid is varied by changing the magnitude of the electric field applied to the fluid, the spring rate of the strut is varied.

Further, U.S. Pat. Nos. 4,942,947, 4,992,190, 5,167,850, 5,176,368 all to Shtarkman, and U.S. Pat. Nos. 5,257,681, 5,354,488, 5,367,459, 5,517,096 and 5,655,757 to Shtarkman, et al., each of which is assigned to the Assignee of the present invention and is incorporated by reference herein, disclose devices utilizing fluid compositions which are responsive to an electric or magnetic field. By controlling the magnitude of the field, the spring and damping characteristics of the devices can be manipulated.

In view of the foregoing, it would be desirable to provide an apparatus for damping vibrations in the latch mechanism of a telescoping component by utilizing a fluid responsive to an electric or magnetic field.

SUMMARY OF THE INVENTION

The above and other objects are provided by a damped latch mechanism for a telescoping structure including an inner tubular member slidingly received within an outer tubular member. A first latch member is coupled within the outer tubular member and a second latch member is coupled to the inner tubular member so as to selectively interfere with the first latch member to prevent the inner tubular member from moving in an axial first direction relative to the outer tubular member. A fluid chamber is provided on one of the first and second latch members opposite the other of the first and second latch members. A magneto-rheological fluid is disposed within the fluid chamber to absorb shock between the first and second latch members. A magnetic field source is provided proximate the magneto-rheological fluid for imposing a magnetic field upon the magneto-rheological fluid to change the viscosity thereof to effectuate different damping characteristics between the first and second latch members. According to one embodiment of the present invention, the magnetic field source comprises an electromagnet electrically coupled to a power source communicating with a sensor for changing the magnitude of the magnetic field according to vibrations detected by the sensor. In another embodiment of the present invention, the first and second latch members comprise oppositely charged rare earth magnets which generate a fixed magnetic field across the magneto-rheological fluid. In still yet another embodiment of the present invention, an electromagnet is adapted to negate the magnetic field between first and second rare earth magnetic latch members so as to simply effectuate disengagement therebetween.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIGS. 4a and 4b illustrate an alternate embodiment of the latch mechanism of FIG. 3 in an unlatched and latched mode; and FIGS. 5a and 5b illustrate still yet another embodiment of a latch mechanism according to the present invention illustrated in an unlatched and latched mode.

DETAILED DESCRIPTION OF THE PREFERRED EMBODIMENTS

The present invention is directed towards a damping mechanism for absorbing the shock between latch members in a telescoping structure. Spacecraft deployed antennas typically include telescoping structures which enable the antenna to be stored and transported in a collapsed state and subsequently expanded into a deployed enlarged configuration. Such antennas commonly utilize telescoping struts for expanding a longitudinal and circumferential length of the structure. These telescoping strut elements require a latch mechanism to maintain them in an expanded mode. According to the present invention, a damping mechanism is provided within the latch mechanism to absorb oppositely directed forces between latch members which may damage the latch members and compromise the integrity of the lock-up.

Figure 1:
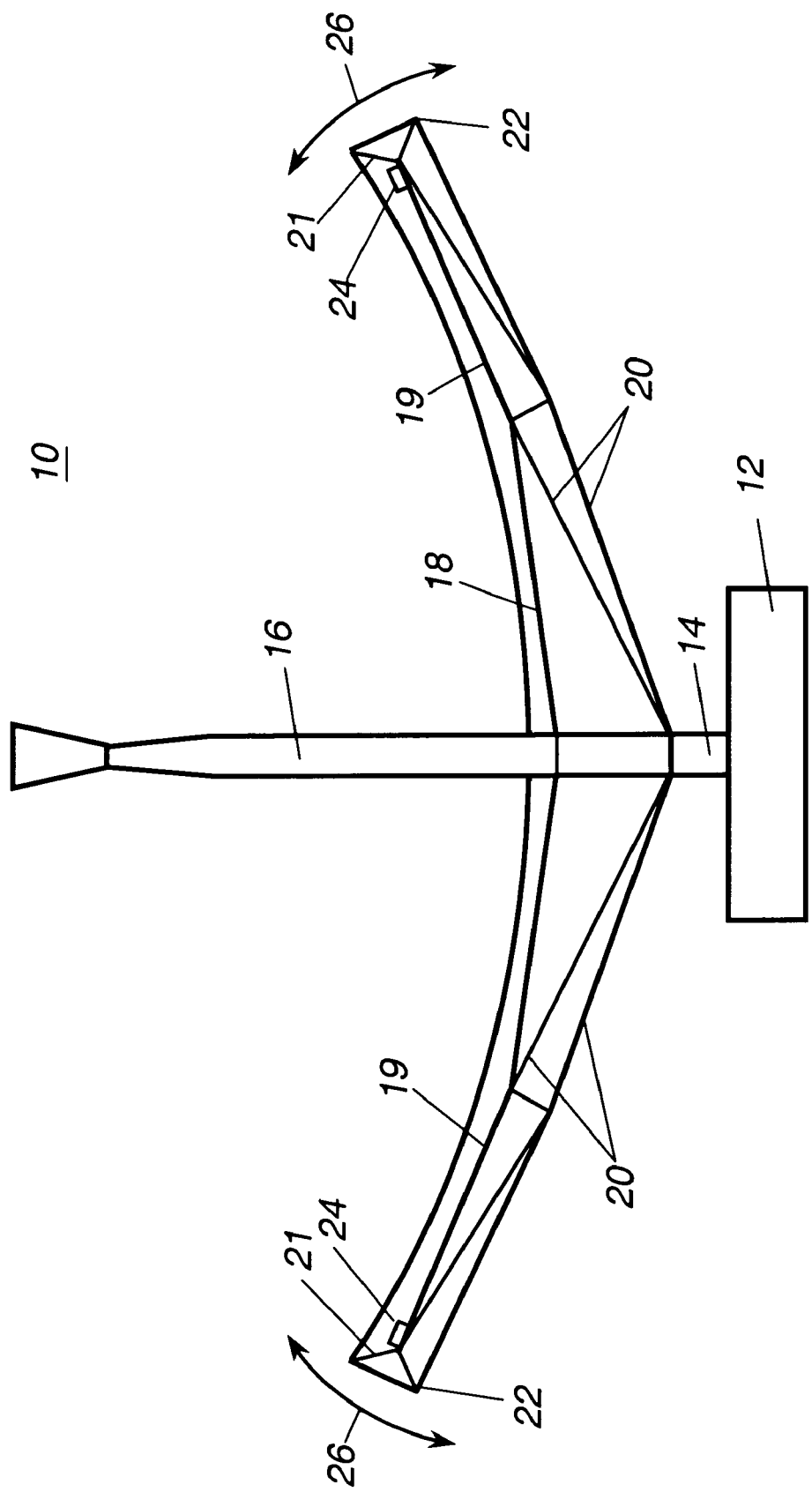
FIG. 1 is a schematic, side, elevational view of a spacecraft antenna incorporating the latch mechanism of the present invention.

Turning now to the drawing figures, FIG. 1 illustrates a spacecraft antenna 10 employing a damper according to the present invention. The spacecraft antenna 10 is coupled to a platform 12, such as a spacecraft, at the antenna base 14. The antenna 10 includes an elongated, tubular feed tower 16 supporting a foldable dish-like structure 18 thereabout. The dish-like structure 18 includes a plurality of radially projecting ribs 19 pivotally coupled at a first end to the feed tower 16 and coupled at a second end to a spreader bar 21. As such, the foldable dish-like structure 18 forms a deployable, concave, dish-like member opening away from the spacecraft 12.

In order to steady the antenna 10 relative to the spacecraft 12, a plurality of cable guidelines 20 extend under tension between the antenna base 14 and remote portions 22 of the antenna 10 along the foldable dish-like structure 18. A plurality of guidelines 20 in the form of cables extend under tension between the antenna base 14 and remote portions 22 of the antenna 10 along the dish-like structure 18. A plurality of sensors 24, such as accelerometers, are periodically disposed on the dish-like structure 18 proximate the remote portions 22 of the antenna 10. The sensors 24 detect slewing of the antenna 10 relative to the spacecraft 12 as indicated by the double-headed arrows 26. Although nearly any arrangement of the sensors 24 will suffice, arranging them equidistantly about the circumference of the hoop 21 provides the most slewing data for the damping elements described below. Other type of sensors such as deformation and/or strain sensors can be interposed along the guidelines 20 for detecting the oscilations 26.

Figure 2:
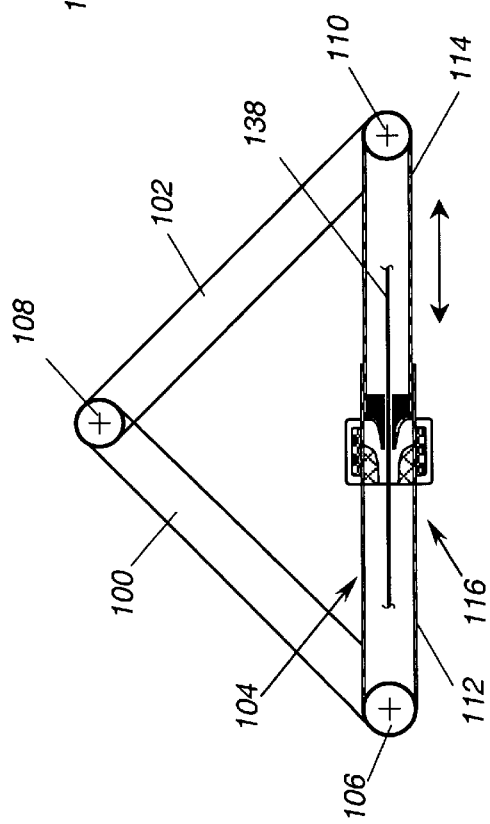
FIG. 2 is a view of one individual nodule cluster employed in the construction of the antenna of FIG. 1 in partial cross-section with the cross-sectional strut illustrated in the expanded mode.

Turning now to FIG. 2, a portion of the antenna structure of FIG. 1 is illustrated in greater detail. The portion includes three tubular sections 100, 102, and 104 interconnected by three hinges 106, 108, and 110. Tube 104 is expandable from a first position to an elongated second position. To accomplish this, tube 104 includes an outer tubular member 112 and an inner tubular member 114. In order to fix the tube 104 in an extended position, a latch mechanism 116 is provided.

Figure 3:
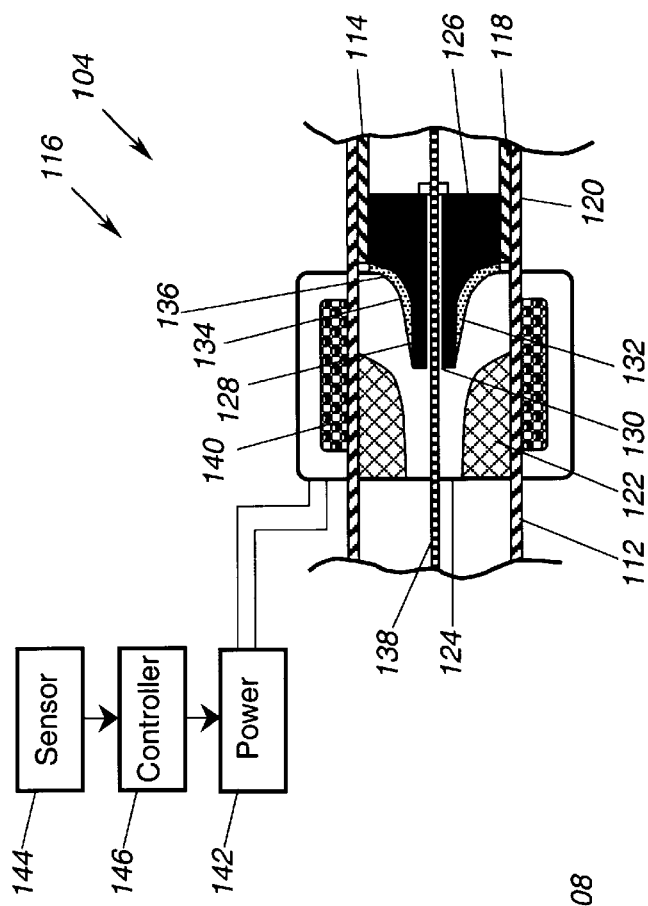
FIG. 3 is a more detailed view of the latch mechanism illustrated in the strut section of FIG. 2.

Referring now to FIG. 3, a more detailed view of the latch mechanism 116 is illustrated. As can be seen, the inner tubular member 114 is nested within the outer tubular member 112 such that an external radial surface 118 of the inner tubular member slides against the inner radial surface of the outer tubular member 112. A first latch member 122 made of magnetizable material such as iron, nickel, cobalt, or their alloys is coupled within the outer tubular member 112 to the inner radial surface 120. Preferably, the first latch member 122 forms a stop for the latch mechanism 116. The first latch member 122 includes an axial bore formed therethrough which preferably has a toroidal shape.

The latch mechanism 116 also includes a second latch member 126 made of magnetizable material such as iron, nickel, cobalt or their alloys coupled to the inner tubular member 114. The second latch member 126 preferably forms a key for cooperating with the first latch member 122. The second latch member 126 includes a projection 128 extending axially therefrom preferably having a toroidal shape complementary of the axial bore 124. The second latch member 126 and projection 128 also include an axial bore 130 extending therethrough.

A flexible bladder 132, preferably made from mylar, is coupled to the projection 128 about the axial bore 130. The bladder 132 forms a fluid chamber 134 between the first and second latch members 122 and 126. A magneto-rheological fluid 136 is disposed within the fluid chamber 134 for actively and/or passively damping shock between the first and second latch members 122 and 126 which may arise as a result of spacecraft maneuvers and/or other disturbances. A magneto-rheological fluid is a two-phase material which has its resistance to flow varied as a function of a magnetic field acting on the fluid.

A cable 138 extends through the outer tubular member 112 and inner tubular member 114 via the axial bore 124 of the first latch member 122 and the axial bore 130 of the second latch member 126 and projection 128. The cable 138 is secured to the second latch member 126 for moving the inner tubular member 114 relative to the outer tube member 112. The cable 138 also effectuates a latched mode for the latch mechanism 116 by forcing the second latch member 126 against the first latch member 122 such that the projection 128 interferes with the surface of the first latch member 122 adjacent the axial bore 124.

An electro-magnet 140 is coupled to the perimeter of the outer tubular member 112 proximate the magneto-rheological fluid 136 for selectively providing a magnetic field thereacross. The electro-magnet 140 is electrically coupled to a power source 142 which communicates by telemetry or a conventional wiring harness with a sensor 144 via a controller 146. The sensor 144 is preferably one of the sensors 24 located on the remote portions 22 of antenna 10 (see FIG. 1) for detecting oscillations thereof.

In operation, the cable 138 is tensioned such that the projection 128 of the second latch member 126 nests within the axial bore 124 of the first latch member 122. In this latched mode, the fluid chamber 134 is sandwiched between the first and second latch members 122 and 126. At this point a preselected magnetic field is imposed upon the magneto-rheological fluid 136 from the electro-magnet 140. As the antenna 10 experiences oscillations due to spacecraft maneuvers or disturbances, the sensor 144 sends signals corresponding to the oscillations to the controller 146. In response to the signals from the sensor 144, the controller 146 provides output signals to control the power source 142. The power source 142 changes the magnitude of the current delivered to the electromagnet 140. In response, the electromagnet 140 varies the magnitude of the magnetic field applied to the magneto-rheological fluid 136. The viscosity of the magneto-rheological fluid 136 changes in proportion to the magnitude of the magnetic field which changes the damping at the latch mechanism 116. As such, the vibrations detected by the sensor 144 are damped by the magneto-rheological fluid 136 to protect the latch mechanism 116 from excessive wear or impact-induced damage and the settling time of the antenna 10 due to slewing is reduced.

The magnetic field acting on the magneto-rheological fluid 136 has a strength proportional to the voltage potential across the electromagnet 140. The resistance to flow of the magneto-rheological fluid 136 is proportional to the strength of the magnetic field applied across the fluid. Thus, when the voltage from the power source 142 is varied, the resistance to flow of the magneto-rheological fluid 136 is varied. When the resistance to flow of the magneto-rheological fluid 136 is varied, the damping characteristics of the latch mechanism 116 is varied. As the resistance to flow of the fluid 136 decreases, the damping rate of the latch mechanism 116 decreases. Likewise, as the resistance to flow of the fluid 136 increases, the damping rate of the latch mechanism 116 increases. Thus, the damping characteristics of the latch mechanism 116 are varied and controlled in response to the magnetic field applied to the fluid 136.

Another way to vary the strength of the magnetic field applied to the fluid 136 is to change the distance between the electromagnet 140 and the fluid chamber 134. Also, the size of the magnetic field can be changed by varying the area of the electromagnet 140 which is in facing relationship. Accordingly, the actual configuration of the latch mechanism 116 may be selected to provide the desired damping characteristics corresponding to the specific application into which it is incorporated.

Referring now to FIGS. 4a and 4b, an alternate embodiment of the damped latch mechanism 116b is illustrated. In this embodiment, like reference numerals are used to indicate like components of the first embodiment. As can be seen, the inner tubular member 114b is nested within the outer tubular member 112b such that an external radial surface 118b of the inner tubular member 114b slides against the inner radial surface 120b of the outer tubular member 112b. A first latch member 122b is coupled within the inner tubular member 114b. Preferably, the first latch member 122b forms a stop for the latch mechanism 116b. The first latch member 122b includes an axial bore 124b formed therethrough. The first latch member 122b also includes a recess 148 formed in a first surface 150 about the axial bore 124b.

The latch mechanism 116b also includes a second latch member 126b coupled to the outer tubular member 112b via a sleeve 113. The second latch member 126b preferably forms a key for cooperating with the first latch member 122b. The second latch member 126b includes an axial bore 130b extending therethrough.

A flexible bladder 132b, preferably made from mylar, is coupled to the second latch member 126b about the axial bore 130b. The bladder 132b forms a fluid chamber 134b between the first and second latch members 122b and 126b. A magneto-rheological fluid 136b is disposed within the fluid chamber 134b for actively and/or passively damping shock between the first and second latch members 122b and 126b which may arise as a result of spacecraft maneuvers and/or other disturbances. As can be seen, the bladder 132b is preferably shaped to complement the recess 148 such that upon latching, the bladder 132b deforms so as to allow the magneto-rheological fluid 136b to fill the recess 148.

A cable 138b extends through the outer tubular member 112b and inner tubular member 114b via the axial bore 124b of the first latch member 122b and the axial bore 130b of the second latch member 126b. The cable 138b is secured to the second latch member 126b for moving the outer tubular member 112b relative to the inner tube member 114b. The cable 138b also effectuates a latched mode for the latch mechanism 116b by forcing the second latch member 126b against the first latch member 122b. The first latch member 122b preferably comprises a positively charged rare-earth magnetic material such as samarium cobalt, neodymium-iron-boron, and/or permanent magnet Alnico. Similarly, the second latch member 126b preferably comprises an oppositely charged rare-earth magnetic material such as samarium cobalt, neodymium-iron-boron, and/or permanent magnet Alnico. As such, the first latch member 122b and the second latch member 126b are drawn toward each other to strengthen the holding power of the latching mechanism 116b and impose a magnetic field across the magneto-rheological fluid 136b and the fluid chamber 134b. Accordingly, a fixed viscosity of the magneto-rheological fluid 136b may be established for damping shock between the first and second latch members 122b and 126b as the inner tubular member 114b moves relative to the outer tubular member 112b.

Referring now to FIGS. 5a and 5b, another alternate embodiment of the damped latch mechanism 116b is illustrated. In this embodiment, like reference numerals are used to indicate like components of the embodiment illustrated in FIGS. 4a and 4b. As can be seen, the inner tubular member 114c is nested within the outer tubular member 112c such that an external radial surface 118c of the inner tubular member 114c slides against the inner radial surface 120c of the outer tubular member 112c. A first latch member 122c is coupled within the inner tubular member 114c. Preferably, the first latch member 122c forms a stop for the latch mechanism 116c. The first latch member 122c includes an axial bore 124c formed therethrough. The first latch member 122c also includes a recess 148c formed in a first surface 150c about the axial bore 124c.

The latch mechanism 116c also includes a second latch member 126c coupled to the outer tubular member 112c via a sleeve 113c. The second latch member 126c preferably forms a key for cooperating with the first latch member 122c. The second latch member 126c includes an axial bore 130c extending therethrough.

A flexible bladder 132c, preferably made from mylar, is coupled to the second latch member 126c about the axial bore 130c. The bladder 132c forms a fluid chamber 134c between the first and second latch members 122c and 126c. A magneto-rheological fluid 136c is disposed within the fluid chamber 134c for actively and/or passively damping shock between the first and second latch members 122c and 126c which may arise as a result of spacecraft maneuvers and/or other disturbances. As can be seen, the bladder 132c is preferably shaped to complement the recess 148c such that upon latching, the bladder 132c deforms so as to allow the magneto-rheological fluid 136c to fill the recess 148c.

A cable 138c extends through the outer tubular member 112c and inner tubular member 114c via the axial bore 124c of the first latch member 122c and the axial bore 130c of the second latch member 126c. The cable 138c is secured to the second latch member 126c for moving the outer tubular member 112c relative to the inner tube member 114c. The cable 138c also effectuates a latched mode for the latch mechanism 116c by forcing the second latch member 126c against the first latch member 122c. The first latch member 122c preferably comprises a positively charged rare-earth magnetic material such as samarium cobalt, neodymium-iron-boron. Other permanent magnet such as Alnico can be successfully used. Similarly, the second latch member 126c preferably comprises an oppositely charged rare-earth magnetic material such as samarium cobalt, neodymium-iron-boron. Other permanent magnet such as Alnico can be successfully used. As such, the first latch member 122c and the second latch member 126c are drawn toward each other to strengthen the holding power of the latching mechanism 116c and impose a magnetic field across the magneto-rheological fluid 136c and the fluid chamber 134c. Accordingly, a fixed viscosity of the magneto-rheological fluid 136c may be established for damping shock between the first and second latch members 122c and 126c as the inner tubular member 114c moves relative to the outer tubular member 112c. In addition, an electro-magnet 140c is coupled to the perimeter of the outer tubular member 112c proximate the magneto-rheological fluid 136c for selectively providing a magnetic field thereacross. The electro-magnet 140c is electrically coupled to a power source 142c which communicates by telemetry or a conventional wiring harness with a sensor 144c via a controller 146c. The sensor 144c is preferably one of the sensors 24 located on the remote portions 22 of antenna 10 (see FIG. 1) for detecting oscillations thereof.

In operation, the cable 138c is tensioned such that the second latch member 126c is adjacent the first latch member 122c. In this latched mode, the fluid chamber 134c is sandwiched between the first and second latch members 122c and 126c. At this point a preselected magnetic field is imposed upon the magneto-rheological fluid 136c from the electromagnet 140c and the first and second latch members 122c and 126c. As the antenna 10 experiences oscillations due to spacecraft maneuvers or disturbances, the sensor 144c sends signals corresponding to the oscillations to the controller 146c. In response to the signals from the sensor 144c, the controller 146c provides output signals to control the power source 142c. The power source 142c changes the magnitude of the current delivered to the electromagnet 140c. In response, the electromagnet 140c varies the magnitude of the magnetic field applied to the magneto-rheological fluid 136c. The viscosity of the magneto-rheological fluid 136c changes in proportion to the magnitude of the magnetic field which changes the damping at the latch mechanism 116c. As such, the vibrations detected by the sensor 144c are damped by the magneto-rheological fluid 136c to protect the latch mechanism 116c from excessive wear or impact-induced damage and the settling time of the antenna 10 due to slewing is reduced.

The electromagnet 140c can also be configured to negate the magnetic field established between the first latch member 122c and second latch member 126c. In this way, the latch mechanism 116c can be easily disconnected without the need for physically overcoming the attractive forces between the first and second latch members 122c and 126c.

Thus, the present invention provides a latching mechanism for a telescoping structure which damps relative motion between the components of the structure. To accomplish this, a magneto-rheological fluid is disposed in a bladder between the members of a latching mechanism. A magnetic field imposed across the magneto-rheological fluid controls its viscosity such that the vibrations are isolated.

Those skilled in the art can now appreciate from the foregoing description that the broad teachings of the present invention can be implemented in a variety of forms. For instance, one skilled in the art will appreciate that an electro-rheological fluid could substitute for the magneto-rheological fluid described above. An electro-rheological fluid is a two-phase material which has its resistance to flow varied as a function of an electric field acting on the fluid. Therefore, while this invention has been described in connection with particular examples thereof, the true scope of the invention should not be so limited since other modifications will become apparent to the skilled practitioner upon a study of the drawings, specification, and following claims.

What is claimed is:

1. A damped latch for a telescoping structure comprising:
an outer tubular member;
an inner tubular member slidingly received within said outer tubular member;
a first latch member coupled within said outer tubular member and including a cylindrical stop having an axial bore formed therethrough;
a second latch member coupled to said inner tubular member so as to selectively interfere with said first latch member to prevent said inner tubular member from moving in an axial first direction relative to said outer tubular member;
a fluid chamber coupled to one of said first latch member and said second latch member opposite the other of said first latch member and said second latch member;
a magneto-rheological fluid disposed within said fluid chamber to absorb shock between said first latch member and said second latch member; and
a magnetic field source proximate said magneto-rheological fluid for imposing a magnetic field upon said magneto-rheological fluid.

2. The damped latch of claim 1 further comprising a cable coupled to one of said outer tubular member and said inner tubular member for moving said first latch member relative to said second latch member.

3. The damped latch of claim 1 wherein said magnetic field source further comprises an electromagnet electrically coupled to a power source for varying a magnitude of said magnetic field.

4. The damped latch of claim 3 wherein said power source communicates with at least one sensor for varying a current delivered to said electromagnet according to signals from said sensor corresponding to vibrations detected by said sensor.

5. The damped latch of claim 1 wherein said fluid chamber further comprises a flexible bladder.

6. The damped latch of claim 1 wherein said axial bore is toroidally shaped.

7. The damped latch of claim 6 wherein said second latch member further comprises a cylindrical key having a toroidally shaped axial projection extending therefrom for cooperating with said axial bore of said first latch member.

8. The damped latch of claim 7 wherein said key and projection include an axial bore formed therethrough for accommodating a cable secured to said second latch member, said cable being operable for moving said second latch member relative to said first latch member.

9. The damped latch of claim 7 wherein said fluid chamber further comprises a flexible bladder secured about said projection.

10. The damped latch of claim 1 wherein said stop includes an annular recess formed in a first surface about said axial bore.

11. The damped latch of claim 10 wherein said fluid chamber further comprises a flexible bladder complimentary said annular recess.

12. A damped latch for a telescoping structure comprising:

an outer tubular member;

an inner tubular member slidingly received within said outer tubular member;

a first latch member coupled within said outer tubular member and comprising a rare earth magnet;

a second latch member coupled to said inner tubular member so as to selectively interfere with said first latch member to prevent said inner tubular member from moving in an axial first direction relative to said outer tubular member and comprising a rare earth magnet oppositely charged from said first latch member;

a fluid chamber coupled to one of said first latch member and said second latch member opposite the other of said first latch member and said second latch member;

a magneto-rheological fluid disposed within said fluid chamber to absorb shock between said first latch member and said second latch member; and a magnetic field source proximate said magneto-rheological fluid for imposing a magnetic field upon said magneto-rheological fluid.

13. The damped latch of claim 12 wherein said first latch member and said second latch member further comprise said magnetic field source.

14. The damped latch of claim 13 further comprising an electromagnet proximate said magneto-rheological fluid for varying said magnetic field.

15. The damped latch of claim 14 wherein said electromagnet projects a magnetic field suitable for negating said magnetic field generated by said rare earth magnets.

* * * * *